United States Patent
Zeleznik et al.

(10) Patent No.: US 9,602,921 B2
(45) Date of Patent: Mar. 21, 2017

(54) INDEPENDENTLY CHARGE PUMPS FOR DIFFERENTIAL MICROPHONE

(71) Applicant: Robert Bosch GmbH, Stuttgart (DE)

(72) Inventors: Matthew A. Zeleznik, Pittsburgh, PA (US); John Matthew Muza, Venetia, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/748,339

(22) Filed: Jun. 24, 2015

(65) Prior Publication Data
US 2016/0381455 A1 Dec. 29, 2016

(51) Int. Cl.
*H04R 3/00* (2006.01)
*H04R 19/04* (2006.01)

(52) U.S. Cl.
CPC .............. *H04R 3/00* (2013.01); *H04R 19/04* (2013.01)

(58) Field of Classification Search
CPC .................................. H04R 19/04; H04R 3/00
See application file for complete search history.

(56) References Cited

U.S. PATENT DOCUMENTS

| | | | |
|---|---|---|---|
| 7,208,996 B2 | 4/2007 | Suzuki et al. | |
| 8,290,171 B1 | 10/2012 | Helfrich et al. | |
| 8,461,910 B2 | 6/2013 | Nadimpalli | |
| 2013/0051583 A1 | 2/2013 | Gueorguiev | |
| 2013/0287231 A1* | 10/2013 | Kropfitsch | H02M 3/073 381/113 |
| 2014/0239352 A1* | 8/2014 | Wang | H04R 19/04 257/254 |
| 2014/0270250 A1 | 9/2014 | Muza et al. | |
| 2014/0270262 A1 | 9/2014 | Zeleznik et al. | |
| 2015/0016630 A1 | 1/2015 | Xu et al. | |
| 2015/0125003 A1* | 5/2015 | Wiesbauer | B81B 3/0021 381/111 |

FOREIGN PATENT DOCUMENTS

EP 1959711 8/2008

OTHER PUBLICATIONS

International Search Report and Written Opinion for Application No. PCT/EP2016/062495 dated Feb. 9, 2016 (12 pages).

* cited by examiner

*Primary Examiner* — Simon King
(74) *Attorney, Agent, or Firm* — Michael Best & Friedrich LLP

(57) ABSTRACT

Systems and methods of generating independent adjustable bias voltages for a differential microphone. The microphone system includes a positive adjustable charge pump, a positive sense capacitor, a negative adjustable charge pump, a negative sense-capacitor, and a differential amplifier. The positive adjustable charge pump is configured to generate a positive bias voltage. The positive sense-capacitor is configured to generate a positive sense voltage based on acoustic pressure from a first direction and the positive bias voltage. The negative adjustable charge pump is configured to generate a negative bias voltage. The negative sense-capacitor is configured to generate a negative sense voltage based on the acoustic pressure from the first direction and the negative bias voltage. The differential amplifier is configured to receive the positive and negative sense voltages. The differential amplifier is also configured to generate a differential voltage based on the positive and negative sense voltages.

15 Claims, 7 Drawing Sheets

INDEPENDENTLY CHARGE PUMPS FOR DIFFERENTIAL MICROPHONE

BACKGROUND

Embodiments of the invention relate to independently adjustable positive and negative charge pumps for a differential microphone.

Mechanical and electrical variations in sense-capacitors (or microphone electrodes), namely the mechanical sensitivity and total capacitance, can be compensated for by adjusting a bias voltage on the sense-capacitor in order to achieve optimal microphone performance. For a differential microphone utilizing positive and negative biasing two separate sense-capacitors are required, each having their own mechanical and electrical variations.

SUMMARY

Independent adjustment of the positive and negative biasing circuits allows for each sense-capacitor to be optimized individually.

Thus, one embodiment provides a microphone system. The microphone system includes a positive adjustable charge pump, a positive sense capacitor, a negative adjustable charge pump, a negative sense-capacitor, and a differential amplifier. The positive adjustable charge pump is configured to generate a positive bias voltage. The positive sense-capacitor is configured to receive acoustic pressure from a first direction and the positive bias voltage. The positive sense-capacitor is also configured to generate a positive sense voltage based on the acoustic pressure and the positive bias voltage. The negative adjustable charge pump is configured to generate a negative bias voltage. The negative sense-capacitor is configured to receive the acoustic pressure from the first direction and the negative bias voltage. The negative sense-capacitor is also configured to generate a negative sense voltage based on the acoustic pressure and the negative bias voltage. The differential amplifier is configured to receive the positive sense voltage and the negative sense voltage. The differential amplifier is also configured to generate a differential voltage based on the positive sense voltage and the negative sense voltage.

Another embodiment provides a method of generating independent adjustable bias voltages for a differential microphone. The method includes generating, via a positive adjustable charge pump, a positive bias voltage based on a positive reference voltage and a positive input voltage. The method also includes applying the positive bias voltage to a positive sense-capacitor. The method further includes generating, via the positive sense-capacitor, a positive sense voltage based on the positive bias voltage and acoustic pressure from a first direction. The method also includes generating, via a negative adjustable charge pump, a negative bias voltage based on a negative reference voltage and a negative input voltage. The method further includes applying the negative bias voltage to a negative sense-capacitor. The method also includes generating, via the negative sense-capacitor, a negative sense voltage based on the negative bias voltage and the acoustic pressure from the first direction. The method further includes generating, via a differential amplifier, a differential voltage based on the positive sense voltage and the negative sense voltage.

Other aspects of the invention will become apparent by consideration of the detailed description and accompanying drawings.

DETAILED DESCRIPTION

Figure 1:
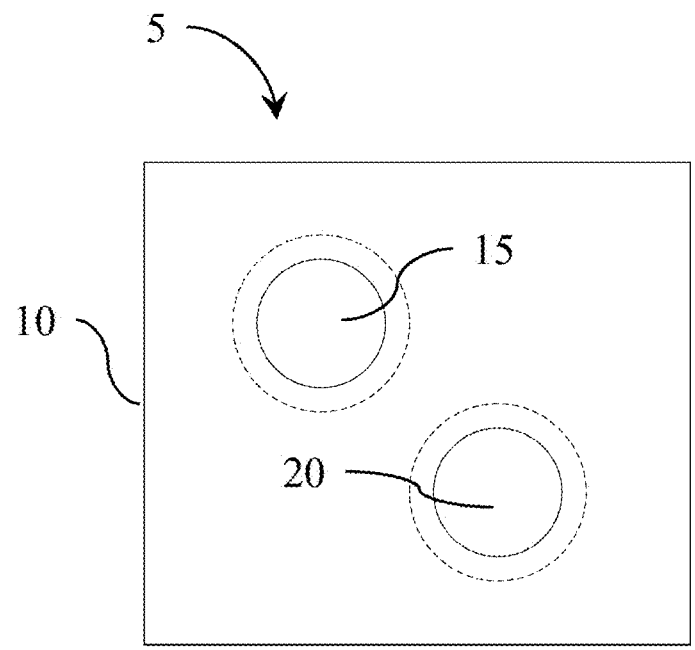
FIG. 1 is an overhead-cutaway view of a differential microphone, in accordance with some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using other known means including direct connections, wireless connections, etc. In addition, the terms "positive" and "negative" are used to distinguish one entity or action from another entity or action without necessarily requiring or implying any such attribute of the entity or action.

It should also be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention. Alternative configurations are possible.

FIG. 1 illustrates a differential microphone 5 that includes a CMOS-MEMS device layer 10. The CMOS-MEMS device layer 10 is constructed primarily of silicon or other materials and includes both CMOS circuitry elements and one or more micro-electro-mechanical structures (MEMS devices) formed directly within the CMOS-MEMS device layer 10. The CMOS-MEMS device layer 10 of FIG. 1 includes a positive sense-capacitor 15 (or MEMS microphone electrode) and a negative sense-capacitor 20 (or MEMS microphone electrode). In the illustrated embodiment, the positive and negative sense-capacitors 15 and 20 are forming on the same package according to the same process. Therefore, acoustic pressures (i.e., sound) directed toward the top surface of the CMOS-MEMS device layer 10 cause substantially the same motion and deflection of the positive and negative sense-capacitors 15, 20.

Figure 2:
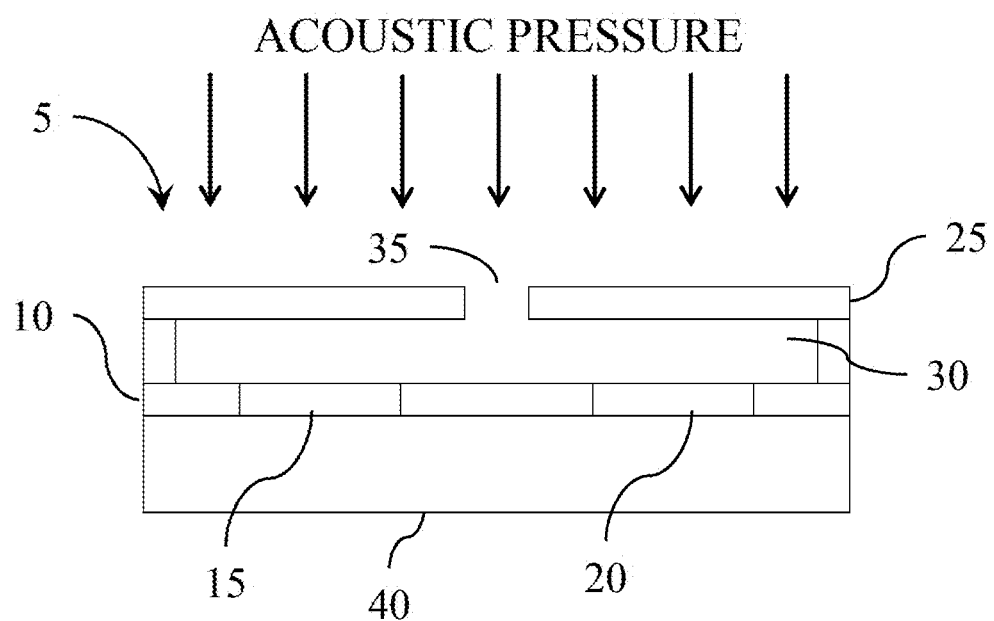
FIG. 2 is a cross-section side view of the differential microphone of FIG. 1.

FIG. 2 illustrates the same differential microphone 5 from a cross-sectional perspective. A lid 25 is positioned above the CMOS-MEMS device layer 10 to form an acoustic channel 30. An opening (or acoustic port) 35 in the lid 25 allows acoustic pressures (sounds) to enter the acoustic channel 30 and cause mechanical deflection of the positive and negative sense-capacitors 15, 20. As shown in FIG. 2, the positive and negative sense-capacitors 15, 20 are arranged equidistant from the acoustic port 35. Therefore, deflections of the positive and negative sense-capacitors 15, 20 caused by acoustic pressures entering through the acoustic port 35 are substantially the same in both the positive and negative sense-capacitors 15, 20. Below the CMOS-MEMS device layer 10 is a back-volume 40 component that allows the positive and negative sense-capacitors 15, 20 to move back and forth (or up and down) in response to the acoustic pressures.

Although the examples described herein refer to a CMOS-MEMS device layer 10, other constructions may include a MEMS device chip and a separate CMOS chip. In such constructions, the positive and negative sense-capacitors 15, 20 may be formed on the same chip (i.e., the MEMS chip). However, in still other constructions, the microphone system package can include two separate MEMS chips—one for each sense-capacitor—as long as the MEMS chips are arranged and manufactured such that a phase (or direction) of both the positive and negative sense-capacitors 15, 20 are the same. Furthermore, in other constructions, the position of the positive and negative sense-capacitors 15, 20 relative to the acoustic port 35 may be different than as illustrated in FIG. 2. For example, the positive and negative sense-capacitors 15, 20 can be sized and arranged so that they are both positioned directly below the acoustic port 35. In some embodiments, the positive and negative sense-capacitors 15, 20 are positioned such that they are not equidistant from the acoustic port 35.

Figure 3:
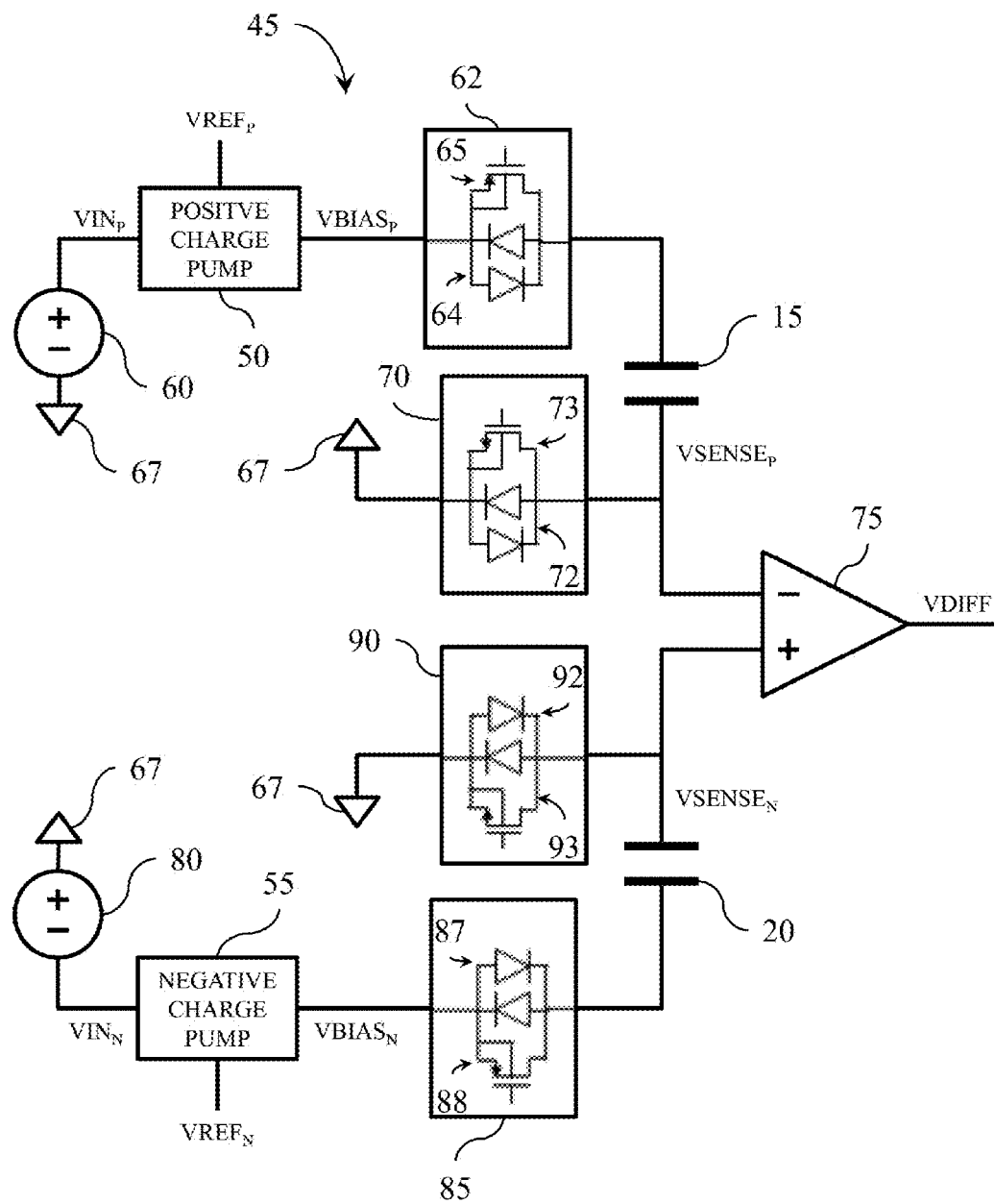
FIG. 3 is a schematic diagram of a differential microphone system, in accordance with some embodiments.

FIG. 3 illustrates a differential microphone system 45 that uses dual polarity biasing with separately adjustable positive and negative charge pumps 50, 55 to provide biasing voltages for the positive and negative sense-capacitors 15, 20 of the differential microphone 5. Using separately adjustable positive and negative charge pumps 50, 55 enables the positive and negative bias voltages to be optimized for each sense-capacitor.

A first voltage source 60 generates a positive input voltage ($VIN_P$). The positive charge pump 50 receives the positive input voltage and a positive reference voltage ($VREF_P$). The positive charge pump 50 generates a positive bias voltage ($VBIAS_P$) for the positive sense-capacitor 15 based on the positive input voltage and the positive reference voltage. A high-impedance device 62 is coupled between the positive charge pump 50 and the positive sense-capacitor 15. As used herein, a high-impedance device can include one or more electronic components designed to increase impedance between a voltage source and a mechanical or electronic component (e.g., the positive sense-capacitor 15). In some embodiments, the high-impedance device 62 includes, among other components, a pair of anti-parallel diodes 64 and a switch 65. The positive sense-capacitor 15 is coupled to a reference node 67 via a high-impedance device 70. In some embodiments, the high-impedance device 70 includes, among other components, a pair of anti-parallel diodes 72 and a switch 73. The positive sense-capacitor 15 is also coupled to a first terminal of a differential amplifier 75. In some embodiments, the positive input voltage is equal to a voltage of the reference node 67. In some embodiments, the reference node 67 is a ground node (e.g., earth ground).

In some embodiments, a second voltage source 80 generates a negative input voltage ($VIN_P$), as illustrated in FIG. 3. In other embodiments, the first voltage source 60 also generates the negative input voltage. The negative charge pump 55 receives the negative input voltage and a negative reference voltage ($VREF_N$). The negative charge pump 55 generates a negative bias voltage ($VBIAS_N$) for the negative sense-capacitor 20 based on the negative input voltage and the negative reference voltage. A high-impedance device 85 is coupled between the negative charge pump 55 and the negative sense-capacitor 20. In some embodiments, the high-impedance device 85 includes, among other components, a pair of anti-parallel diodes 87 and a switch 88. The negative sense-capacitor 20 is coupled to the reference node 67 via a high-impedance device 90. In some embodiments, the high-impedance device 90 includes, among other components, a pair of anti-parallel diodes 92 and a switch 93. The negative sense-capacitor 20 is also coupled to a second terminal of the differential amplifier 75. In some embodiments, the negative input voltage is equal to the voltage of the reference node 67.

During a power-on-reset phase, the positive bias voltage is applied to the positive sense-capacitor 15. At the same time, the negative bias voltage is applied to the negative sense-capacitor 20. After the power-on-reset phase, incident positive sound pressure causes capacitances across both the positive and negative sense-capacitors 15, 20 to increase in value. A positive sense voltage ($VSENSE_P$), applied to the first terminal of the differential amplifier 75, increases with respect to the reference node 67 due to the increase in capacitance and positive charge across the positive sense-capacitor 15. Similarly, a negative sense voltage ($VSENSE_N$), applied to the second terminal of the differential amplifier 75, increases with respect to the reference node 67 due to the increase in capacitance and the negative charge across negative sense-capacitor 20. The positive and negative sense voltages are combined by the differential amplifier 75 to produce a differential voltage (VDIFF) that represents the difference between the positive and negative sense voltages at any given time.

Adjusting the positive bias voltage (e.g., with the positive charge pump 50) enables compensation for mechanical stiffness, geometry, and capacitance variation in the positive sense-capacitor 15. The mechanical stiffness and capacitance variation can be caused by process variations in the manufacturing of the positive sense-capacitor 15. Adjusting the positive bias voltage allows for setting a desired sensitivity of the positive sense voltage in order to maximize signal swing and the signal-to-noise ratio (SNR) of the positive sense-capacitor 15. The negative sense-capacitor 20 may have a different mechanical stiffness, geometry, and capacitance variation than the positive sense-capacitor 15. The negative charge pump 55 enables independent adjustment of the negative bias voltage in order to set a desired sensitivity of the negative sense voltage and maximize the signal swing and the SNR of the negative sense-capacitor 20. The positive and negative bias voltages can further be adjusted to compensate for geometrical differences between the positive and negative sense-capacitors 15, 20.

The acoustic performance of the positive sense-capacitor 15 can be measured by setting the high-impedance device 90 to a low impedance state. In some embodiments, the high-impedance device 90 is set to the low impedance state when the switch 93 is closed. In some embodiments, a non-volatile memory element (e.g., a polysilicon fuse) is used adjust the positive bias voltage in order to set a desired performance of the positive sense-capacitor 15. Similarly, the acoustic performance of the negative sense-capacitor 20 can be measured by setting the high-impedance device 70 to the low impedance state. In some embodiments, the high-impedance device 70 is set to the low impedance state when the switch 73 is closed. In some embodiments, a non-volatile memory is used to adjust the negative bias voltage in order to set a desired performance of the negative sense-capacitor 20.

Various charge pump structures can be used generate the positive and negative bias voltages. In one embodiment, the positive and negative charge pumps 50, 55 include a Dickson charge pump.

Figure 4:
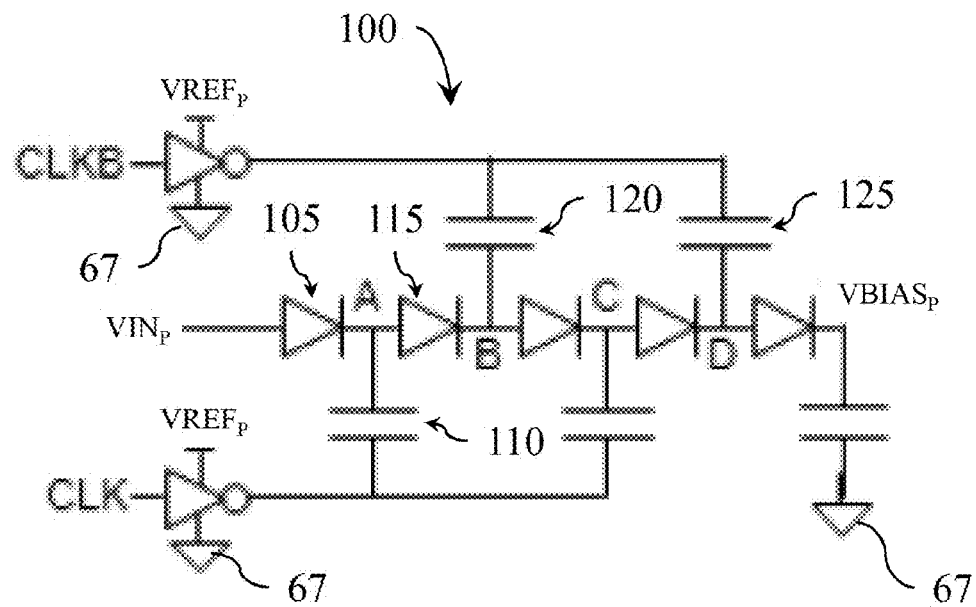
FIG. 4 is a schematic diagram of a positive Dickson charge pump, in accordance with some embodiments.

FIG. 4 illustrates a positive Dickson charge pump 100 for generating the positive bias voltage. After a rising edge of a CLK signal, diode 105 becomes forward biased and capacitor 110 at node A is charged to the positive input voltage ($VIN_P$). After a falling edge of the CLK signal, diode 105 becomes reverse biased and the voltage of capacitor 110 at node A is boosted to the positive input voltage plus a positive reference voltage ($VREF_P$). Also, diode 115 becomes forward biased and the capacitor 120 at node B is charged to the same voltage as capacitor 110 at node A. Each positive Dickson stage follows this operation with capacitor 125 at node D switching between $VIN_P+(4\times VREF_P)$ and $VIN_P+(3\times VREF_P)$. In the configuration illustrated in FIG. 4, the positive bias voltage is $VIN_P+(4\times VREF_P)$. Neglecting inter-stage leakage currents and the output load current, the positive Dickson charge pump 100 produces a positive bias voltage of:

$$VBIAS_P = VIN_P + (n \times VREF_P);$$

where n indicates the number of positive Dickson stages in the positive Dickson charge pump 100.

Figure 5:
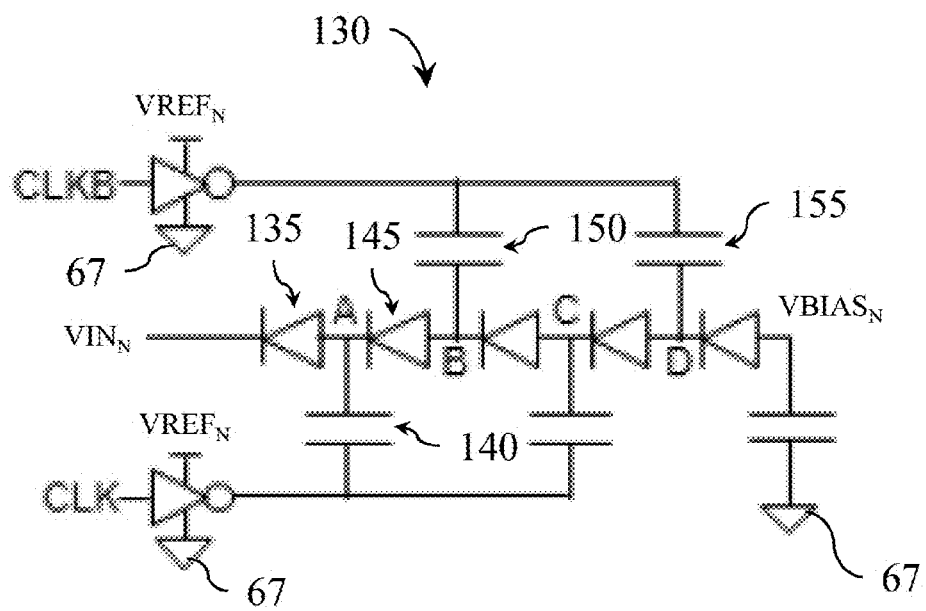
FIG. 5 is a schematic diagram of a negative Dickson charge pump, in accordance with some embodiments.

FIG. 5 illustrates a negative Dickson charge pump 130 for generating the negative bias voltage. After a falling edge of a CLK signal, diode 135 becomes forward biased and a capacitor 140 at node A is charged to the negative input voltage ($VIN_N$). After a rising edge of the CLK signal, diode 135 becomes reverse biased and the voltage of capacitor 140 at node A is boosted to the negative input voltage plus a negative reference voltage ($VREF_N$). Also, diode 145 becomes forward biased and capacitor 150 at node B is charged to the same voltage as capacitor 140 at node A. Each negative Dickson stage follows this operation with capacitor 155 at node D switching between $VIN_N-(4\times VREF_N)$ and $VIN_N-(3\times VREF_N)$. In the configuration illustrated in FIG. 5, the negative bias voltage is $VIN_N-(4\times VREF_N)$. Neglecting inter-stage leakage currents and the output load current, the negative Dickson charge pump 130 produces a negative bias voltage of:

$$VBIAS_N = VIN_N - (n \times VREF_N);$$

where n indicates the number of negative Dickson stages in the negative Dickson charge pump 130.

Figure 6:
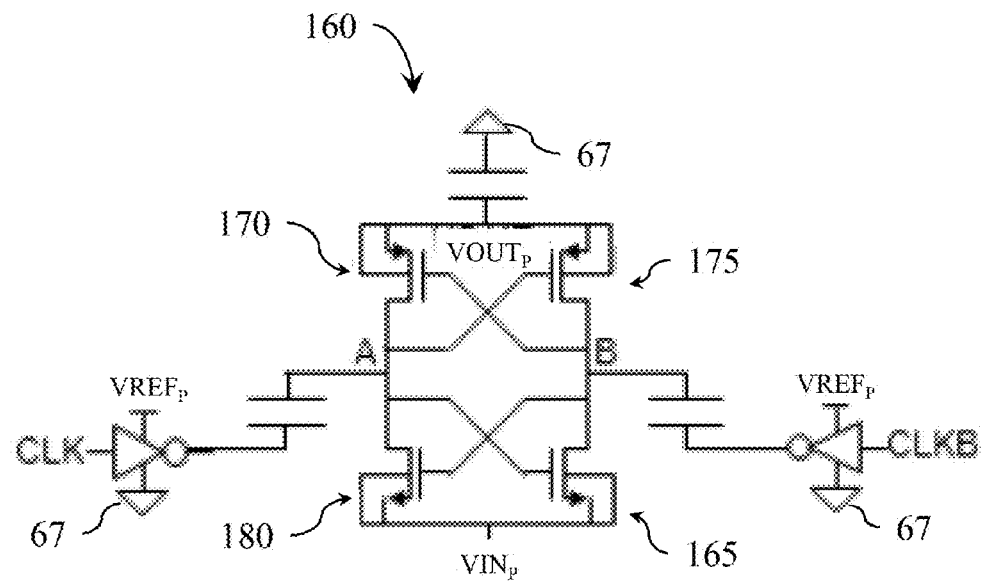
FIG. 6 is a schematic diagram of a positive voltage doubler, in accordance with some embodiments.

In some embodiments, the diodes in the positive and negative Dickson charge pumps 100, 130 are replaced with pairs of complementary metal-oxide semiconductor (CMOS) devices configured as a voltage doubler. FIG. 6 illustrates a positive voltage doubler 160 (or positive MOS stage). The positive voltage doubler 160 includes, among other components, NMOS transistors 165 and 170, and PMOS transistors 175 and 180. The NMOS transistors 165 and 170 turn on after a rising edge of a CLK signal to either node A or node B due to the low impedance at their source terminal. Similarly, the PMOS transistors 175 and 180 turn on after a falling edge to node A or node B. At any given time, either the NMOS transistors 165 and 170 are turned on or the PMOS transistors 175 and 180 are turned on. After a falling edge of the CLK signal, NMOS transistor 165 is turned on and node B will charge to the positive input voltage ($VIN_P$). When the clock switches and a rising edge of the CLK signal occurs, the voltage at node B will increase to $VIN_P+VREF_P$ and will be transferred to the positive output ($VOUT_P$) through PMOS transistor 175. The same operation occurs on the other side during the other half of the clock cycle.

Figure 7:
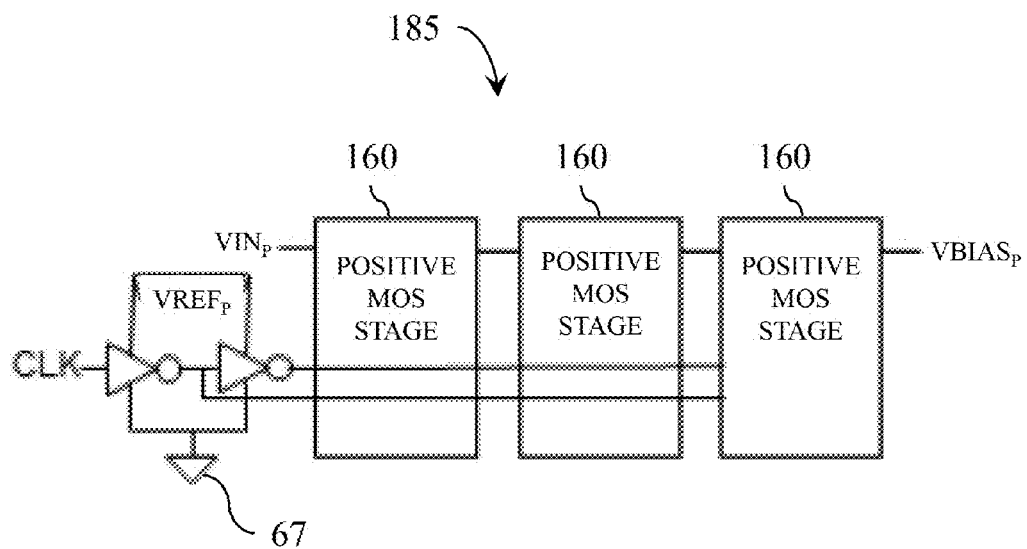
FIG. 7 is a schematic diagram of a positive MOS charge pump, in accordance with some embodiments.

FIG. 7 illustrates a positive MOS charge pump 185. The positive MOS charge pump 185 includes, among other components, a series of positive voltage doublers 160 (or positive MOS stages). The positive voltage doublers 160 are coupled in a series configuration to produce the positive bias voltage. Neglecting inter-stage leakage currents and the output load current, the positive MOS charge pump 185 produces a positive bias voltage of:

$$VBIAS_P = VIN_P - (n \times VREF_P);$$

where n indicates the number of positive MOS stages 160 in the positive MOS charge pump 185.

Figure 8:
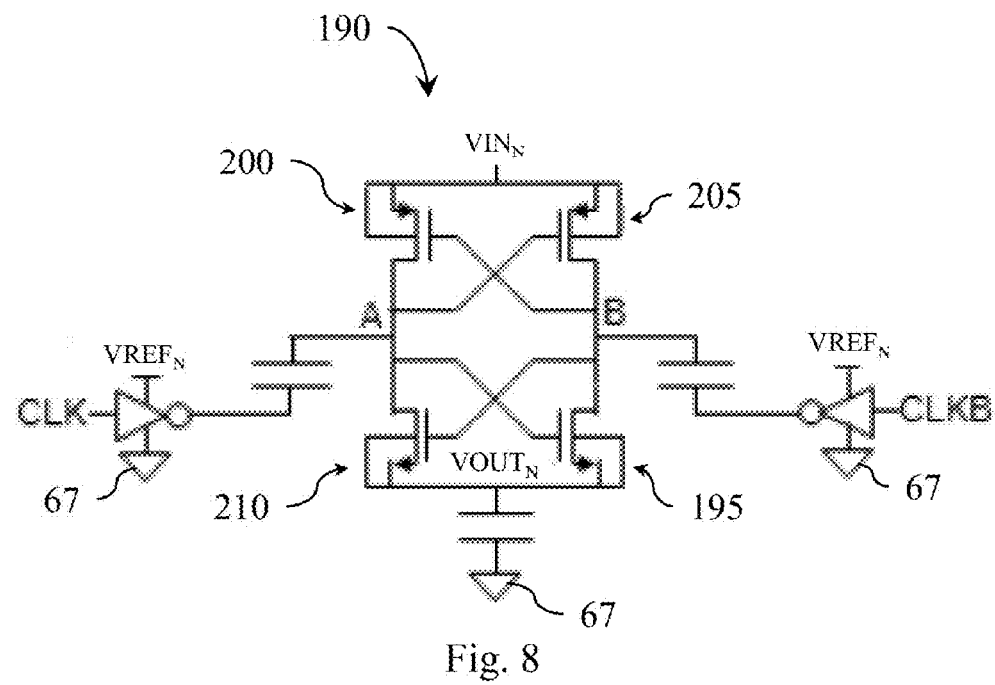
FIG. 8 is a schematic diagram of a negative voltage doubler, in accordance with some embodiments.

FIG. 8 illustrates a negative voltage doubler 190 (or negative MOS stage). The negative voltage doubler 190 includes, among other components, NMOS transistors 195 and 200, and PMOS transistors 205 and 210. The PMOS transistors 205 and 210 turn on after a falling edge of a CLK signal to either node A or node B due to the low impedance at their source terminal. Similarly, the NMOS transistors 195 and 200 turn on after a rising edge of the CLK signal to node A or node B. At any given time either the PMOS transistors 205 and 210 are turned on or the NMOS transistors 195 and 200 are turned on. After a rising edge of the CLK signal, PMOS transistor 205 is turned on and node B will charge to the negative input voltage ($VIN_N$). When the clock switches and a falling edge of the CLK signal occurs, the voltage at node B will change to $VIN_N-VREF_N$ and will be transferred to the output through NMOS transistor 195. The same operation occurs on the other side during the other half of the clock cycle.

Figure 9:
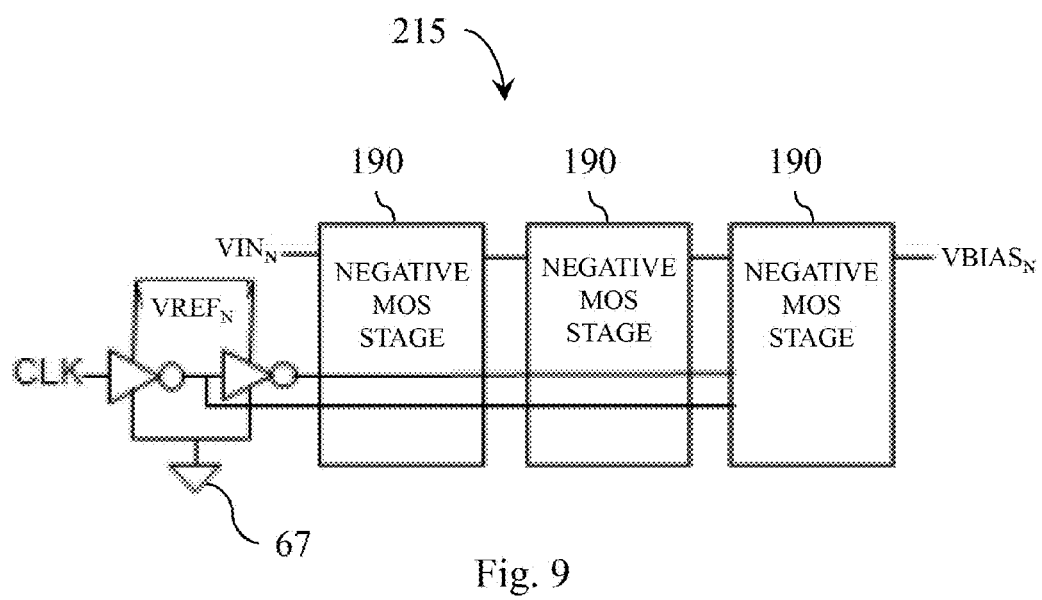
FIG. 9 is a schematic diagram of a negative MOS charge pump, in accordance with some embodiments.

FIG. 9 illustrates negative MOS charge pump 215. The negative MOS charge pump 215 includes, among other components, a series of negative voltage doublers 190 (or negative MOS stages). The negative voltage doublers 190 are coupled in a series configuration to produce the negative bias voltage. Neglecting inter-stage leakage currents and the output load current, the negative MOS charge pump 215 produces a negative bias voltage of:

$$VBIAS_N = VIN_N - (n \times VREF_N);$$

where n indicates the number of negative MOS stages 190 in the negative MOS charge pump 215.

Both Dickson charge pumps and MOS charge pumps operate on the same principles of charging one plate of a capacitor while the other plate is held to voltage of the reference node 67 during one clock phase. During the other phase, the charging capacitor is disconnected from a low impedance voltage source while the bottom plate of the capacitor is driven to a new reference voltage. The similarity in operation can also be seen in the similarity of the equations used to represent the positive and negative bias voltages (included above). Therefore, the Dickson and MOS charge pumps offer similar means of adjusting the bias voltage.

Figure 10:
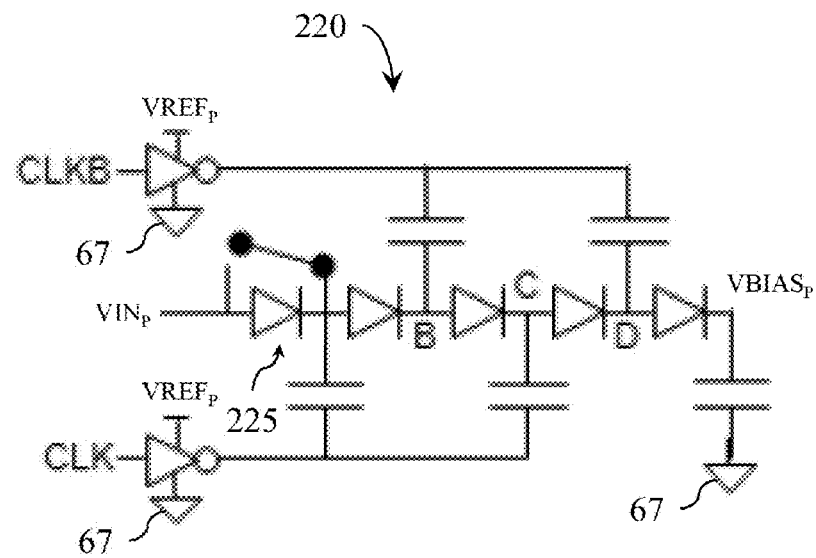
FIG. 10 is a schematic diagram of a positive Dickson charge pump, in accordance with some embodiments.
Figure 11:
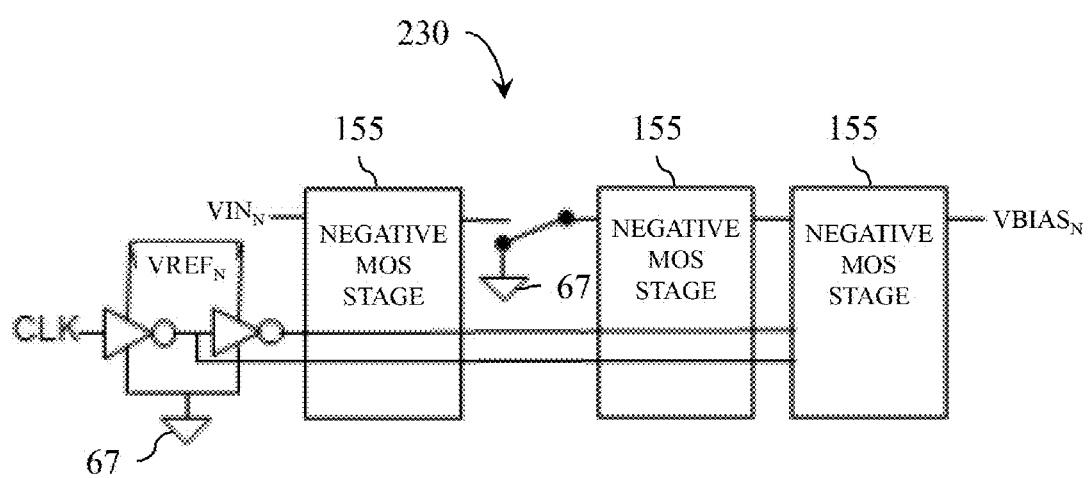
FIG. 11 is a schematic diagram of a negative MOS charge pump, in accordance with some embodiments.

In some embodiments, the positive and negative bias voltages are adjusted by disabling a number of stages in the charge pump string. A sufficient number of stages are needed to achieve the largest desired bias voltage when all the stages are enabled. Smaller bias voltages are produced by either shorting stages out through a switch or not clocking certain stages. This provides a very coarse trimming resolution since n in the equations (included above) only include integer values. FIG. 10 illustrates an exemplary 4-stage positive Dickson charge pump 220 which can be converted to a 3 stage charge pump by shorting out a diode 225 (or positive Dickson stage). In other embodiments, the input to the second stage is switched to a new reference voltage or the reference node 67, as illustrated with the negative MOS charge pump 230 in FIG. 11. Furthermore, the clock signal to any given stage could be disabled by replacing the inverters with logic gates.

Figure 12:
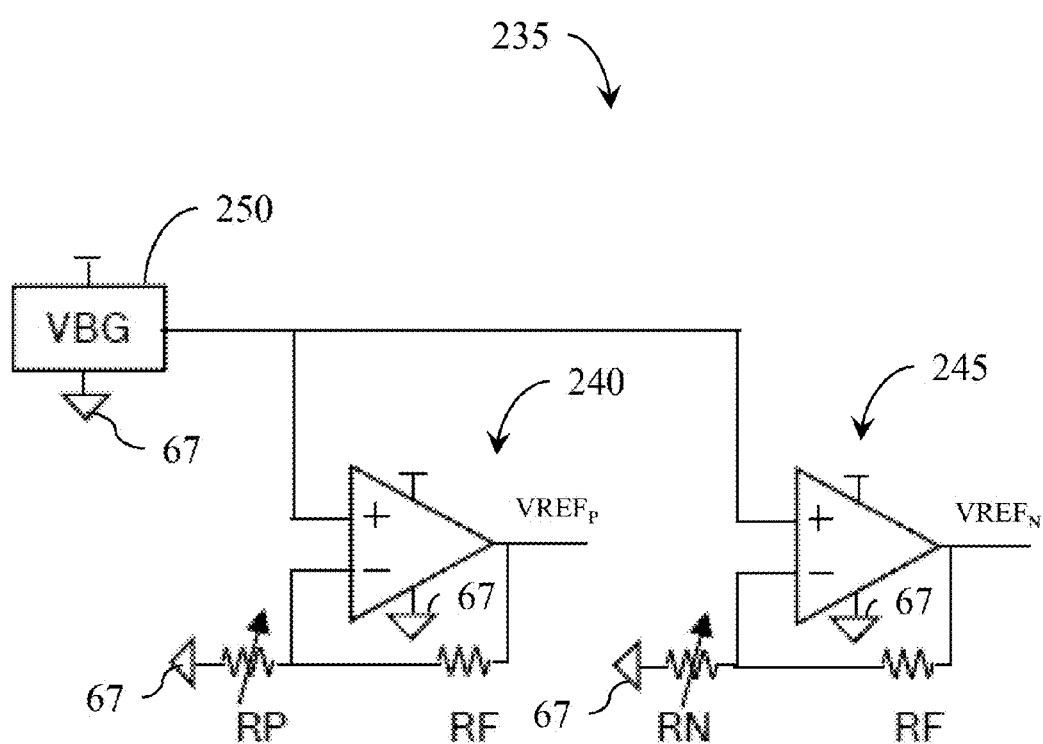
FIG. 12 is a schematic diagram of a circuit architecture for generating positive and negative reference voltages, in accordance with some embodiments.

In some embodiments, the positive and negative bias voltages are adjusted by adjusting the positive and negative references voltages used to create the clock signal to each stage of the positive and negative charge pumps 50, 55. In some embodiments, the positive and negative reference voltages are derived from a power supply and temperature independent reference. FIG. 12 illustrates a circuit architecture 235 for generating the positive and negative reference voltages, according to one embodiment of the invention. A positive voltage regulator 240 generates the positive reference voltage and a negative voltage regulator 245 generates the negative reference voltage. The positive and negative reference voltages are generated based in part on a process, voltage, and temperature independent reference 250. Both the positive and negative reference voltages can be independently adjusted by adjusting (e.g., trimming) the value of either resistor RN or resistor RP. In other embodiments, other methods can be used to generate the positive and negative reference voltages for the positive and negative charge pumps. In some embodiments, the positive reference voltage is equal to the negative reference voltage.

In the presence of leakage currents, both the clock frequency and the size of the charge pump stage capacitor will affect the efficiency of the structure. In some embodiments, the positive bias voltage is adjusted by adjusting (e.g., trimming) a frequency of the CLK signal for the positive charge pump 50 and the negative bias voltage is adjusted by adjusting (e.g., trimming) a frequency of the CLK signal for the negative charge pump 55.

In some embodiments, the large capacitors in the positive and negative charge pumps 50, 55 are replaced by a bank of smaller capacitors to alter the efficiency of the positive and negative charge pumps 50, 55 by switching in or out the total number of smaller capacitors making up the large capacitor.

Thus, embodiments of the invention provides, among other things, systems and methods of independently adjusting positive and negative bias voltages for positive and negative sense-capacitors 15, 20 in a differential microphone 5. Various features and advantages of the invention are set forth in the following claims.

What is claimed is:

1. A microphone system comprising:
a positive adjustable charge pump configured to generate a positive bias voltage;
a positive sense-capacitor configured to
receive acoustic pressure from a first direction,
receive the positive bias voltage, and
generate a positive sense voltage based on the acoustic pressure and the positive bias voltage;
a negative adjustable charge pump configured to generate a negative bias voltage;
a negative sense-capacitor configured to
receive the acoustic pressure from the first direction,
receive the negative bias voltage, and
generate a negative sense voltage based on the acoustic pressure and the negative bias voltage; and
a differential amplifier configured to
receive the positive sense voltage,
receive the negative sense voltage, and
generate a differential voltage based on the positive sense voltage and the negative sense voltage;
wherein a magnitude of the positive bias voltage is different than a magnitude of the negative bias voltage; and
wherein the positive adjustable charge pump includes
a plurality of positive stages coupled in a series configuration and configured to generate the positive bias voltage based on a positive reference voltage and a positive input voltage, and
a positive clock circuit configured to apply the positive reference voltage to the plurality of positive stages in a clocked manner based on a first frequency; and
wherein the negative adjustable charge pump includes
a plurality of negative stages coupled in a series configuration and configured to generate the negative bias voltage based on a negative reference voltage and a negative input voltage, and
a negative clock circuit configured to apply the negative reference voltage to the plurality of negative stages in a clocked manner based on a second frequency.

2. The microphone system according to claim 1, wherein the positive adjustable charge pump is further configured to adjust the positive bias voltage by disabling at least one positive stage of the plurality of positive stages, wherein the negative adjustable charge pump is further configured to adjust the negative bias voltage by disabling at least one negative stage of the plurality of negative stages.

3. The microphone system according to claim 1, wherein the positive adjustable charge pump is further configured to adjust the positive bias voltage by adjusting the first frequency, wherein the negative adjustable charge pump is further configured to adjust the negative bias voltage by adjusting the second frequency.

4. The microphone system according to claim 1, wherein the positive adjustable charge pump further includes a positive voltage regulator configured to generate the positive reference voltage, wherein the negative adjustable charge pump further includes a negative voltage regulator configured to generate the negative reference voltage.

5. The microphone system according to claim 4, wherein the positive adjustable charge pump is further configured to adjust the positive bias voltage by adjusting the positive reference voltage, wherein the negative adjustable charge pump is further configured to adjust the negative bias voltage by adjusting the negative reference voltage.

6. The microphone system according to claim 1, wherein the positive sense-capacitor is coupled to a first terminal of the differential amplifier, and wherein the negative sense-capacitor is coupled to a second terminal of the differential amplifier.

7. The microphone system according to claim 6, further comprising:
a first high-impedance device coupled between the first terminal and a reference node; and
a second high-impedance device coupled between the second terminal and the reference node.

8. The microphone system according to claim 1, wherein each of the plurality of positive stages includes a positive Dickson stage, and wherein each of the plurality of negative stages includes a negative Dickson stage.

9. The microphone system according to claim 1, wherein each of the plurality of positive stages includes a positive MOS stage, wherein each of the plurality of negative stages includes a negative MOS stage.

10. A method of generating independent adjustable bias voltages for a differential microphone, the method comprising:
generating, via a positive adjustable charge pump, a positive bias voltage based on a positive reference voltage and a positive input voltage;
applying the positive bias voltage to a positive sense-capacitor;
generating, via the positive sense-capacitor, a positive sense voltage based on the positive bias voltage and acoustic pressure from a first direction;
generating, via a negative adjustable charge pump, a negative bias voltage based on a negative reference voltage and a negative input voltage;
applying the negative bias voltage to a negative sense-capacitor;
generating, via the negative sense-capacitor, a negative sense voltage based on the negative bias voltage and the acoustic pressure from the first direction;
generating, via a differential amplifier, a differential voltage based on the positive sense voltage and the negative sense voltage;
generating, via the positive adjustable charge pump, a second positive bias voltage;
applying the second positive bias voltage to the positive sense-capacitor;
generating, via the positive sense-capacitor, a second positive sense voltage based on the second positive bias voltage and the acoustic pressure from the first direction;
generating, via the differential amplifier, a second differential voltage based on the second positive sense voltage; and
determining the positive bias voltage based on the second differential voltage; and
wherein a magnitude of the positive bias voltage is different than a magnitude of the negative bias voltage.

11. The method according to claim 10, further comprising:
generating, via the negative adjustable charge pump, a second negative bias voltage;
applying the second negative bias voltage to the negative sense-capacitor;
generating, via the negative sense-capacitor, a second negative sense voltage based on the second negative bias voltage and the acoustic pressure from the first direction;
generating, via the differential amplifier, a third differential voltage based on the second negative sense voltage; and
determining the negative bias voltage based on the third differential voltage.

12. The method according to claim 11, wherein a magnitude of the second positive bias voltage is equal to a magnitude of the second negative bias voltage.

13. The method according to claim 10, wherein generating the positive bias voltage includes disabling at least one positive stage of a plurality of positive stages in the positive adjustable charge pump; wherein generating the negative bias voltage includes disabling at least one negative stage of a plurality of negative stages in the negative adjustable charge pump.

14. The method according to claim 10, wherein generating the positive bias voltage includes adjusting the positive reference voltage, wherein generating the negative bias voltage includes adjusting the negative reference voltage.

15. The method according to claim 10, wherein generating the positive bias voltage includes adjusting a first frequency in which the positive reference voltage is applied to a plurality of positive stages in the positive adjustable charge pump, wherein generating the negative bias voltage includes adjusting a second frequency in which the negative reference voltage is applied to a plurality of negative stages in the negative adjustable charge pump.

* * * * *